US011281619B2

(12) United States Patent
Schaeffer et al.

(10) Patent No.: US 11,281,619 B2
(45) Date of Patent: Mar. 22, 2022

(54) INTERFACE BUS RESOURCE ALLOCATION (71) Applicant: Apple Inc., Cupertino, CA (US)

(72) Inventors: Ian P. Schaeffer, Los Gatos, CA (US);
Eric C. Gaertner, San Jose, CA (US);
John T. Orchard, Los Gatos, CA (US);
Michael W. Murphy, Menlo Park, CA
(US); Ronald P. Songco, Sunnyvale,
CA (US); Corey N. Axelowitz, San
Francisco, CA (US); Brett W. Degner,
Menlo Park, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 16/815,239

(22) Filed: Mar. 11, 2020

(65) Prior Publication Data

US 2020/0311012 A1 Oct. 1, 2020

Related U.S. Application Data (60) Provisional application No. 62/823,749, filed on Mar. 26, 2019.

(51) Int. Cl.
G06F 13/42 (2006.01)
H01R 12/73 (2011.01)
H01R 13/66 (2006.01)

(52) U.S. Cl.
CPC ....... G06F 13/4282 (2013.01); H01R 12/737 (2013.01); H01R 13/6683 (2013.01); G06F 2213/0026 (2013.01); H01R 2201/06 (2013.01)

(58) Field of Classification Search
CPC ......... G06F 13/4282; G06F 2213/0026; H01R 12/737; H01R 13/6683; H01R 2201/06
See application file for complete search history.

(56) References Cited

U.S. PATENT DOCUMENTS

| 5,991,158 | A | 11/1999 | Chan et al. |
| 7,325,086 | B2 | 1/2008 | Kong et al. |
| 7,447,825 | B2 | 11/2008 | Chen |
| 7,756,123 | B1 | 7/2010 | Huang et al. |
| 8,661,178 | B2 | 2/2014 | Richard |
| 2001/0014927 | A1* | 8/2001 | Chang ................... G06F 13/409 710/301 |
| 2007/0139423 | A1* | 6/2007 | Kong ..................... G09G 5/363 345/502 |

(Continued)

Primary Examiner — Henry Tsai
Assistant Examiner — Harry Z Wang
(74) Attorney, Agent, or Firm — Young Basile Hanlon & MacFarlane, P.C.

(57) ABSTRACT

A computer includes a processor, a PCIe-compatible interface bus that includes a root that is connected to the processor, and a routing complex that is connected to the root and is controlled by the processor. The computer also includes a first interface slot that is connectable to the root by the switches, a second interface slot that is connectable to the root by the switches, and an extended interface slot that is connectable to the root by the switches. The switches are configured based on properties of a first peripheral device to define a first switching configuration when the first peripheral device is connected only to the first interface slot and to define a second switching configuration when the first peripheral device is connected to both of the first interface slot and the extended interface slot.

20 Claims, 6 Drawing Sheets (56) References Cited

U.S. PATENT DOCUMENTS

| | | | |
|---|---|---|---|
| 2007/0214301 A1* | 9/2007 | Chen | G06F 13/4081 710/301 |
| 2009/0157920 A1* | 6/2009 | Foster, Sr. | G06F 13/409 710/62 |
| 2010/0164963 A1* | 7/2010 | Sakariya | G09G 5/363 345/502 |
| 2011/0169840 A1* | 7/2011 | Bakalash | G06T 1/60 345/505 |
| 2011/0296062 A1 | 12/2011 | Isobe et al. | |
| 2012/0036306 A1* | 2/2012 | Miyoshi | G06F 13/4022 710/316 |
| 2012/0260015 A1 | 10/2012 | Gay et al. | |
| 2013/0058037 A1 | 3/2013 | Berry et al. | |
| 2014/0059265 A1 | 2/2014 | Iyer et al. | |
| 2014/0359189 A1* | 12/2014 | Kotzur | G06F 13/385 710/305 |
| 2015/0003004 A1 | 1/2015 | Wu | |
| 2015/0212785 A1* | 7/2015 | Chiba | G09G 5/008 345/520 |
| 2015/0294434 A1* | 10/2015 | Nataros | G06F 13/4221 345/520 |
| 2015/0347345 A1* | 12/2015 | Hellriegel | G06F 13/409 710/301 |
| 2017/0052919 A1* | 2/2017 | Purcell | H05K 7/1438 |
| 2017/0103495 A1* | 4/2017 | Sierra | G06F 1/1632 |
| 2018/0120908 A1* | 5/2018 | Pilz | G06F 1/26 |
| 2018/0349188 A1* | 12/2018 | Beckett | G06F 9/50 |
| 2019/0056773 A1* | 2/2019 | Xiao | G06F 1/3215 |

\* cited by examiner

INTERFACE BUS RESOURCE ALLOCATION

CROSS-REFERENCE TO RELATED APPLICATION(S)

This application claims the benefit of U.S. Provisional Application No. 62/823,749, filed on Mar. 26, 2019. The content of the foregoing application is incorporated herein by reference in its entirety for all purposes.

FIELD

The present disclosure relates generally to the field of interface buses for computing devices.

BACKGROUND

Computing devices often include an interface bus that allows peripheral devices to be connected to the computing device. As an example, a peripheral device can be connected to a computing device by connecting an expansion card to a card slot connector that is connected to the interface bus. Interface buses are often implemented according to a standard, such as the Peripheral Component Interconnect Express (PCIe) standard.

SUMMARY

One aspect of the disclosure is a computer that includes a memory device, a processor, a PCIe-compatible interface bus that includes a root that is connected to the memory device and the processor, and a routing complex that is connected to the root and is controlled by the processor. The computer also includes a first interface slot that is connectable to the root by the routing complex, a second interface slot that is connectable to the root by the routing complex, and an extended interface slot that is connectable to the root by the routing complex. The routing complex is configured based on properties of a first peripheral device to define a first switching configuration when the first peripheral device is connected only to the first interface slot and to define a second switching configuration when the first interface device is connected to both of the first interface slot and the extended interface slot.

In some implementations, the second interface slot is activated in the first switching configuration, and the second interface slot is deactivated in the second switching configuration.

In some implementations, the first interface slot and the extended interface slot each extend in a longitudinal direction such that the first interface slot is longitudinally aligned with the extended interface slot, and the second interface slot extends in the longitudinal direction and is laterally offset from the first interface slot.

In some implementations, the first interface slot includes a first sensing pin, the extended interface slot includes a second sensing pin, the PCIe-compatible interface bus is configured to detect connection of the first peripheral device to the first interface slot using the first sensing pin, and the PCIe-compatible interface bus is configured to detect connection of the first peripheral device to the extended interface slot using the second sensing pin. In some implementations, the PCIe-compatible interface bus accesses configuration instructions that are stored on the first peripheral device and allocates interface resources to the first interface slot, the extended interface slot, and the second interface slot based on the configuration instructions.

Another aspect of the disclosure is a computer that includes a first interface slot, an extended interface slot, and an interface bus that is connected to the first interface slot and the extended interface slot. The interface bus is operable to sense connection of a first peripheral device to the first interface slot, and to determine whether the first peripheral device is concurrently connected to the first interface slot and the extended interface slot. The interface bus allocates interface resources to the extended interface slot if the first peripheral device is concurrently connected to the first interface slot and the extended interface slot, and the interface bus does not allocate the interface resources to the extended interface slot if the first peripheral device is not concurrently connected to the first interface slot and the extended interface slot.

The computer may also include a second interface slot, wherein the interface bus deactivates the second interface slot if the first peripheral device is concurrently connected to the first interface slot and the extended interface slot.

In some implementations, the first interface slot and the extended interface slot each extend in a longitudinal direction such that the first interface slot is longitudinally aligned with the extended interface slot. In some implementations, the second interface slot extends in the longitudinal direction and is laterally offset from the first interface slot.

In some implementations, the interface bus accesses configuration instructions that are stored on the first peripheral device and allocates the interface resources based on the configuration instructions. In some implementations, the first interface slot includes a first sensing pin, the extended interface slot includes a second sensing pin, the interface bus is configured to detect connection of the first peripheral device to the first interface slot using the first sensing pin, and the interface bus is configured to detect connection of the first peripheral device to the extended interface slot using the second sensing pin.

In some implementations, the computer includes a power connector that is operable to supply additional electrical power to the first peripheral device using a power cable. The power connector may be at least one of a six pin power connector or an eight pin power-connector.

In some implementations, the interface resources include communications channels. In some implementations, the interface resources include electrical power. In some implementations, the extended interface slot is operable to supply at least one-hundred and fifty watts of electrical power to the first peripheral device.

In some implementations, the first interface slot and the second interface slot are each compliant with the PCIe standard.

Another aspect of the disclosure is a computer that includes a system board, a first system-mounted display connector that is connected to the system board, a second system-mounted display connector that is connected to the system board, and a first peripheral device that is connected to the system board and includes a first graphics processing unit that is operable to output a first video signal. The computer also includes a multiplexer that receives the first video signal from the first graphics processing unit and defines a multiplexed signal that includes a first signal portion that corresponds to the first video signal, and a demultiplexer that receives the multiplexed signal and transmits the first signal portion to at least one of the first system-mounted display connector or the second system-mounted display connector.

The computer may also include an interface slot located on the system board and a card edge connector located on the first peripheral device, wherein the first peripheral device is connected to the system board by connection of the card edge connector to the interface slot.

In some implementations, the multiplexer and the demultiplexer are located on the system board. In some implementations, the multiplexer and the demultiplexer are part of an interface bus.

The computer may also include a second peripheral device that is connected to the system board and includes a second graphics processing unit that is operable to output a second video signal, wherein the multiplexer receives the second video signal from the second graphics processing unit and defines the multiplexed signal such that it includes a second signal portion that corresponds to the second video signal.

Another aspect of the disclosure is a method that includes detecting connection of an external display device to a first system-mounted display connector; determining available display resources; selecting a matching display resource from the available display resources based on requirements of the external display device and capabilities of the available display resources; and allocating the matching display resource to the external display device using a routing component that is connected to the available display resources and to the system-mounted display connector.

In some implementations of the method the routing component is configured to route the matching display resource to the external display device through the system-mounted display connector using a multiplexer that is connected to the available display resources and a demultiplexer that is connected to the system-mounted display connector.

Another aspect of the disclosure is a computer that includes a processor and a PCIe-compatible interface bus that includes a root that is connected to the processor, and a routing complex that is connected to the root and is controlled by the processor. The computer also includes a first interface slot that is connectable to the root by the routing complex, and an extended interface slot that is connectable to the root by the routing complex. The first interface slot and the extended interface slot are aligned with one another within a single slot width. The computer also includes one or more system-mounted display connectors. The computer also includes a peripheral device that includes at least a first graphics processing unit and a second graphics processing unit. The routing complex is configurable based on properties of the peripheral device to connect the first graphics processing unit to the one or more system-mounted display connectors through the first interface slot and to connect the second graphics processing unit to the one or more system-mounted display connectors through the extended interface slot.

DETAILED DESCRIPTION

The disclosure herein relates to interface buses for computers that provide additional communications resources and power resources. Additional communications and power resources can be supplied, for example, using an extended interface slot that is used concurrently with a standard interface slot (e.g., an interface slot that complies with a known interface standard, such as the PCIe interface standard).

As an example, the interface buses described herein can be applied to provide additional communications resources and power resources to peripheral devices such as graphics adapters that include multiple graphics processing units. The interface buses described herein also allow for distribution of video signals from peripheral devices to system-mounted display connectors.

Figure 1:
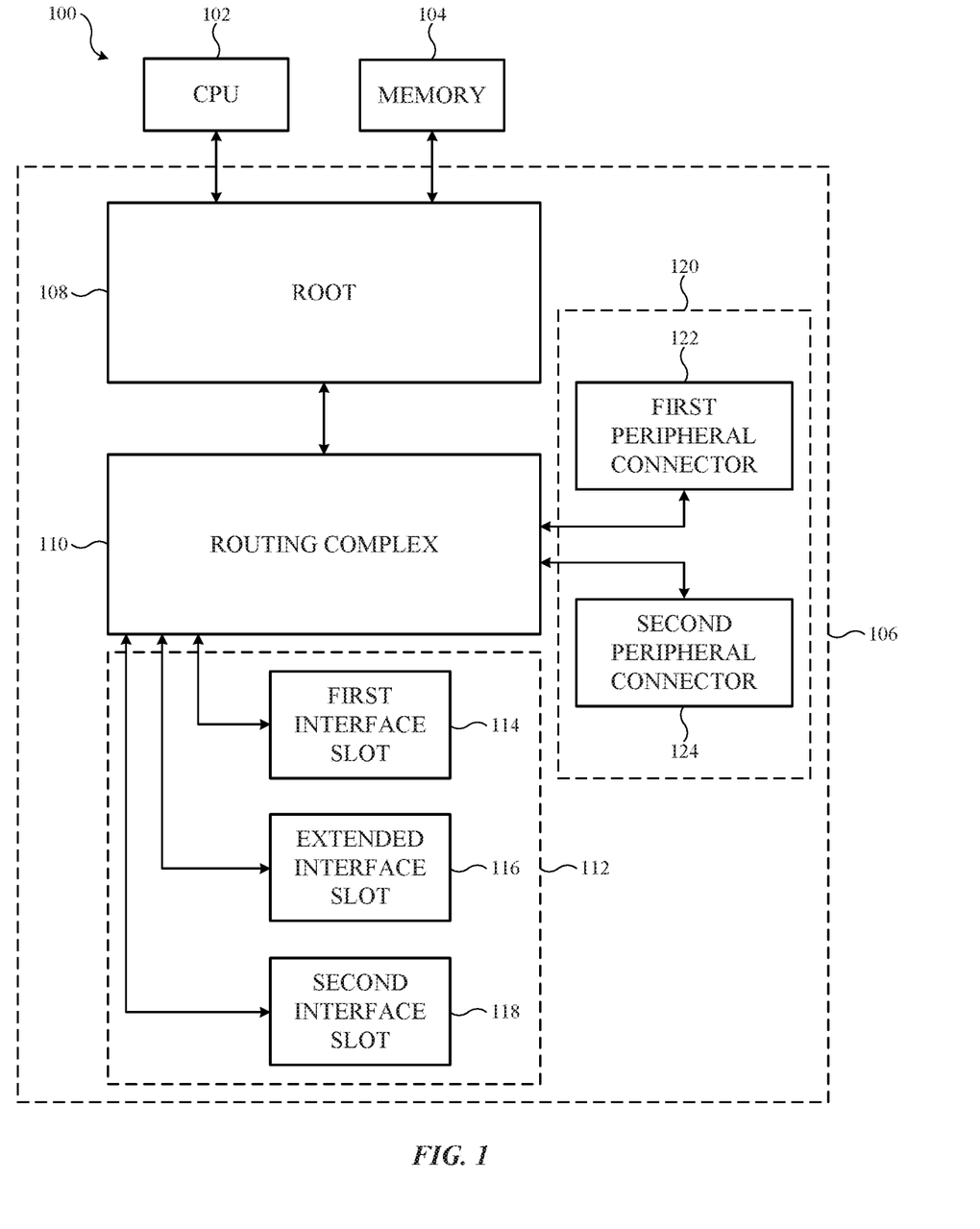
FIG. 1 is a block diagram that shows part of a computer.

FIG. 1 is a block diagram that shows part of a computer 100. The computer 100 includes a central processing unit (CPU) 102, a memory device 104, and an interface bus 106. The interface bus 106 includes a root 108, a routing complex 110, interface slots 112, and peripheral connectors 120. In the illustrated example, the interface slots 112 include a first interface slot 114, an extended interface slot 116, and a second interface slot 118. In the illustrated example, the peripheral connectors 120 include a first peripheral connector 122 and a second peripheral connector 124.

The computer 100 is an example of a device implemented according to the present disclosure. Specific implementations can include additional components that are not shown and described in connection with the computer 100 (e.g., conventional components), can exclude certain components that are shown and described in connection with the computer 100, and/or can replace certain components that are shown and described with respect to the computer 100 with functionally equivalent components.

The CPU 102 may be a conventional computing device, such as a single-core processor or a multi-core processor. Multiple processors may be included in the computer 100. The memory device 104 may be a conventional memory module, such as a random-access memory module. The CPU 102 and the memory device 104 are connected to one another for direct communication (e.g., by transmission of electrical signals by which the CPU 102 reads from and writes to the memory device 104). The CPU 102 and the memory device 104 are also connected to the interface bus 106 by the root 108 of the interface bus 106.

The interface bus 106 allows connection of peripheral devices (not shown in FIG. 1) to the computer 100. In addition to inclusion of physical connectors that provide electrical communication between the computer 100 and the peripheral devices, the interface bus 106 also provides configurable electrical communications channels and configurable logical communications channels. The electrical and logical communications channels provided by the interface bus 106 are similar to PCIe lanes that may be allocated for use by peripheral devices in the PCIe architecture and may be referred to herein as communications lanes. The interface bus 106 may be a PCIe-compatible interface bus, meaning that the interface bus 106 is configured such that it can be connected to and can communicate with peripheral devices that comply with the PCIe standard. The interface bus 106 may also include components that are compatible with other interface standards that can be used for communication with and configuration of the peripheral devices, which as the I2C protocol.

The root 108 is a device that is configured to connect the CPU 102 and the memory device 104 to the interface bus 106 in order to allow communication with peripheral devices. The root 108 is further configured to allocate resources of the interface bus (e.g., communications lanes) to the peripheral devices. The root 108 can be used by the CPU 102 to allocate resources using the routing complex 110, by establishing connections between the interface slots 112 and other components, as will be described herein. The configuration of the routing complex 110 may be determined by the CPU 102, which controls the routing complex 110 using the root 108, such as by providing instructions to the routing complex 110 through the root 108.

The routing complex 110 includes configurable devices that are able to connect multiple peripheral devices to the root 108. The routing complex 110 includes switches, multiplexing components, and demultiplexing components. As an example, individual switches that are included in the routing complex 110 may have a single connection to the root 108 (e.g., at a root port) and multiple connections to interface slots 112, which are in turn connectable to peripheral devices. The number and type of switches, multiplexing components, and demultiplexing components that are included in the routing complex 110 may vary depending on the needs of a particular implementation. The routing complex 110 can be controlled to define multiple switching configurations in dependence on the requirements of the peripheral devices that are connected to the interface slots 112.

The interface slots 112 are physical connectors that configured to physically and electrically connect to peripheral devices. As an example, the interface slots 112 may be connector slots that are configured to receive card-edge connectors that are located on peripheral devices. In the illustrated example, the interface slots 112 include a first interface slot 114, an extended interface slot 116, and a second interface slot 118. The first interface slot 114 and the second interface slot 118 are, in the illustrated example, identically configured. It should be understood that, in alternative implementations, the first interface slot 114 and the second interface slot 118 may not be identically configured. The first interface slot 114 and the second interface slot 118 are each able to supply electrical power (e.g., 75 watts of electrical power) to peripheral devices. The first interface slot 114 and the second interface slot 118 are also able to provide data transmission connections (e.g., PCIe lanes) to the peripheral devices. In some implementations, the first interface slot 114 and the second interface slot 118 are compliant with the PCIe standard (i.e., PCIe compliant cards can be connected and will function as intended).

As will be explained herein, the first interface slot 114 and the extended interface slot 116 are arranged as a pair in a linear alignment with respect to each other to allow concurrent use of the first interface slot 114 and the extended interface slot 116 by a single peripheral device. As will also be explained herein, the second interface slot 118 may operate in dependence on usage of first interface slot 114 and the extended interface slot 116. The extended interface slot 116 may be configured to supply additional electrical power to peripheral devices (e.g., between 150 watts and 600 watts of electrical power). In some implementations, the extended interface slot 116 is configured to supply at least 150 watts of electrical power to peripheral devices.

Figure 2:
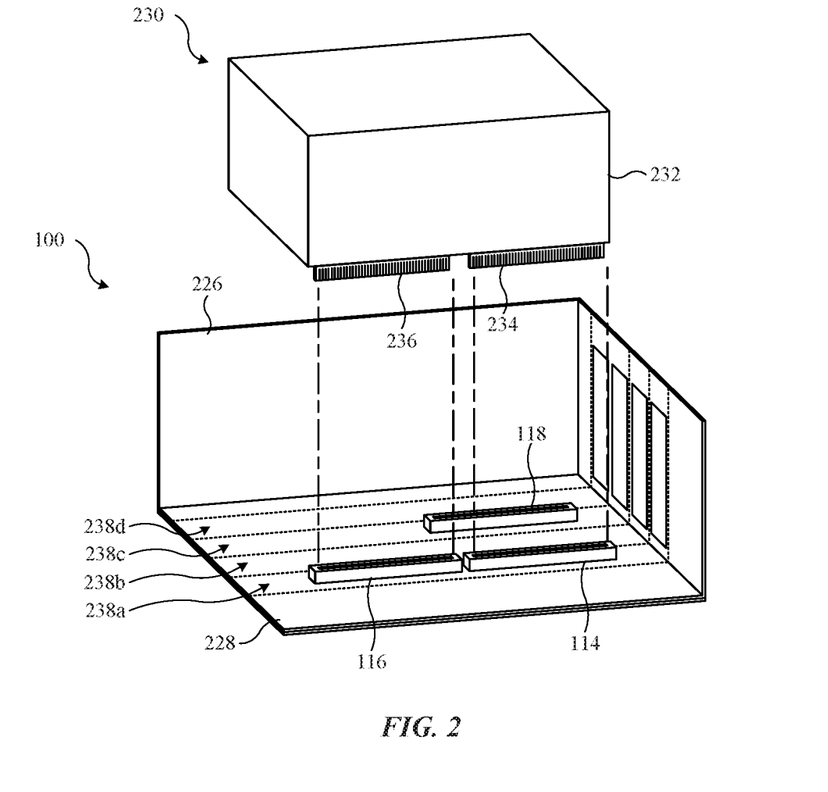
FIG. 2 is an illustration that shows the computer according to a first example with a peripheral device in a disconnected position.
Figure 3:
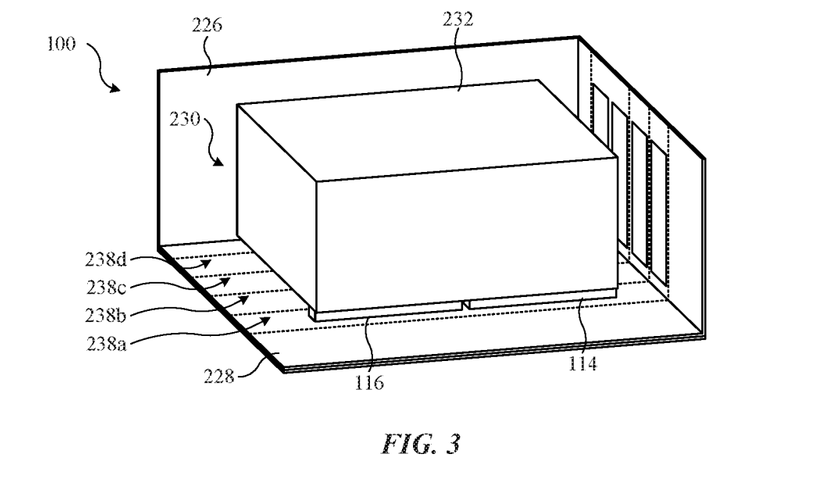
FIG. 3 is an illustration that shows the computer according to the first example with the peripheral device in a connected position.

FIG. 2 is an illustration that shows the computer 100 with a peripheral device 230 in a disconnected position according to a first example, and FIG. 3 is an illustration that shows the computer 100 with the peripheral device 230 in a connected position. In the illustrated example, the computer 100 includes a chassis 226 and a system board 228. The peripheral device 230 is shown in a disconnected position relative to the computer 100. The peripheral device 230 includes a body portion 232. First and second connector portions, such as a first card edge connector 234 and a second card edge connector 236 in the illustrated example, are connected to the body portion 232.

The chassis 226 is a structural component to which components of the computer 100 are secured. The system board 228 is a circuit board that is part of the computer 100. The system board 228 supports and interconnects various components of the computer 100. As an example, the CPU 102, the memory device 104, and the interface bus 106 may be located on the system board 228. Although the system board 228 is shown in the illustrated example in the form of a single circuit board, the components described with respect to the system board 228 may be included in multiple circuit boards that are electrically connected to each other.

The first interface slot 114, the extended interface slot 116, and the second interface slot 118 are each connected to the system board 228, both mechanically and electrically (e.g., for communication with the routing complex 110). Spatially, the first interface slot 114, the extended interface slot 116, and the second interface slot 118 are arranged within standard slot widths, which in the illustrated example are represented by a first slot width 238a, a second slot width 238b, a third slot width 238c, and a fourth slot width 238d. Standard slot widths represent a physical distance by which slots are spaced apart, and are utilized to provide adequate room for connection of peripheral devices to the slots. Interface bus standards (such as the PCIe standard) typically specify distances for slot widths.

The first interface slot 114 and the extended interface slot 116 are arranged in linear alignment with respect to each other within a single slot width, such as the first slot width 238a in the illustrated example. The second interface slot 118 is located within the third slot width 238c and is therefore laterally offset from the first interface slot 114. Thus, the first interface slot 114 and the extended interface slot 116 may each extend in a longitudinal direction such that the first interface slot 114 is longitudinally aligned with the extended interface slot 116, while the second interface slot 118 also extends in the longitudinal direction but is laterally offset from the first interface slot 114.

In the illustrated example, the second slot width 238b and the fourth slot width 238d are not occupied by interface slots. Instead, the space allocated for the second slot width 238b and the fourth slot width 238d can be used by devices that are connected to the first interface slot 114 and the second interface slot 118.

The peripheral device 230 is connectable to the computer 100 by insertion of the first card edge connector 234 into the first interface slot 114 and by insertion of the second card edge connector 236 into the extended interface slot 116.

Thus, in the connected position (FIG. 3) the first card edge connector 234 is disposed in the first interface slot 114 and the second card edge connector 236 is disposed in the extended interface slot 116. In the illustrated example, the second interface slot 118 is unused and therefore no connector is connected to it.

The peripheral device 230 has a width that is larger than the first slot width 238a. In particular, the width of the peripheral device 230 may be equivalent to two times the standard slot width. In the illustrated example, the width of the peripheral device 230 is equivalent to four times the standard slot width and therefore occupies the space above the first slot width 238a, the second slot width 238b, the third slot width 238c, and the fourth slot width 238d. As a result of the volume occupied by the peripheral device 230, the body portion 232 of the peripheral device 230 is located directly above the second interface slot 118, and obstructs access to the second interface slot 118.

The interface bus 106 is configured to control operation of the first interface slot 114, the extended interface slot 116, and the second interface slot 118. The functions that are performed by the interface bus 106 include determining how much electrical power and how much data connection bandwidth will be provided to each of the first interface slot 114, the extended interface slot 116, and the second interface slot 118. For example, the interface bus 106 may determine what power resources are required by the first interface slot 114 and the extended interface slot 116, determine what data connection resources are required by the first interface slot 114 and the extended interface slot 116, and reallocate resources from the second interface slot 118 to the first interface slot 114 and the extended interface slot 116 as needed to meet the requirements.

In some implementations, the interface bus 106 is operable to determine that the peripheral device 230 is obstructing the second interface slot 118, and is able to deallocate resources from the second interface slot 118 in order to provide those resources to other components, such as the first interface slot 114 and the extended interface slot 116. For example, using the routing complex 110, the interface bus 106 is able to "turn off" data connections and power supply connections to the second interface slot 118 when it is not in use and is obstructed such that it cannot be used.

To summarize, the computer 100 may include the first interface slot 114, which is connectable to the root 108 by the routing complex 110, the second interface slot 118, which is connectable to the root 108 by the routing complex 110, and the extended interface slot 116, which is connectable to the root 108 by the routing complex 110. The components of the routing complex 110 are configured based on properties of the peripheral device 230 to define multiple switching configurations.

In one example, the routing complex 110 is configured to define a first switching configuration when the peripheral device 230 is connected only to the first interface slot 114 and to define a second switching configuration when the peripheral device 230 is connected to both of the first interface slot 114 and the extended interface slot 116. In the first switching configuration, resources are not allocated to the extended interface slot 116, and those resources are instead provided to the second interface slot 118. In the second switching configuration, resources are provided to the extended interface slot 116 and are deallocated from the second interface slot 118, which may be physically obstructed by the peripheral device 230.

Thus, the interface bus 106 may be configured to allocate interface resources to the extended interface slot 116 if the peripheral device 230 is concurrently connected to the first interface slot 114 and the extended interface slot 116, and the interface bus 106 does not allocate the interface resources to the extended interface slot 116 if the peripheral device 230 is not concurrently connected to the first interface slot 114 and the extended interface slot 116. In addition, the second interface slot 118 may be activated in the first switching configuration, and the second interface slot 118 may be deactivated in the second switching configuration.

Figure 4:
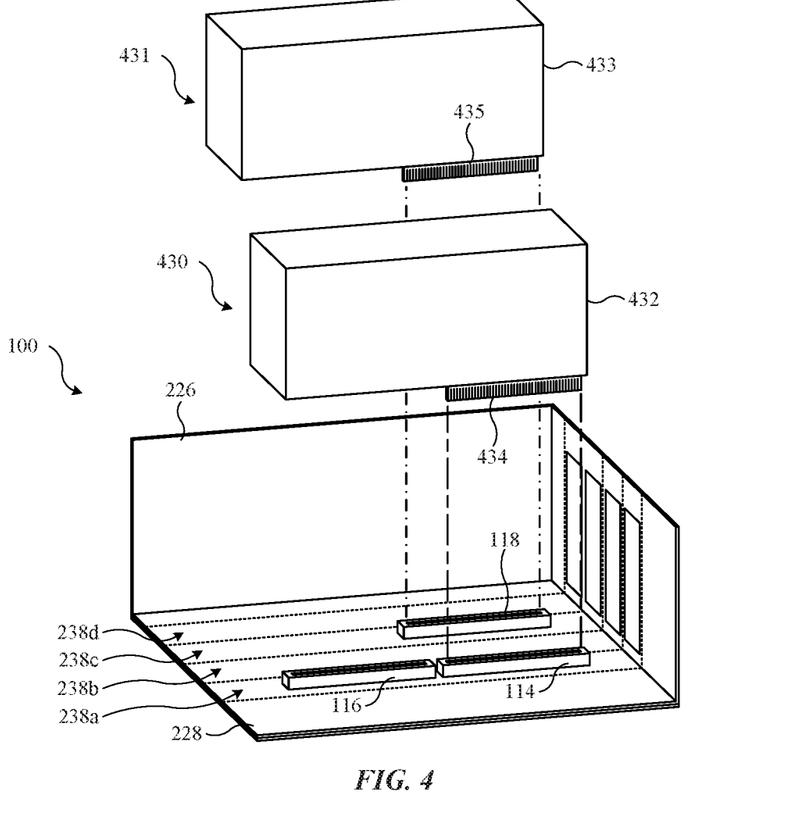
FIG. 4 is an illustration that shows the computer according to a second example with a first peripheral device and a second peripheral device in a disconnected position.
Figure 5:
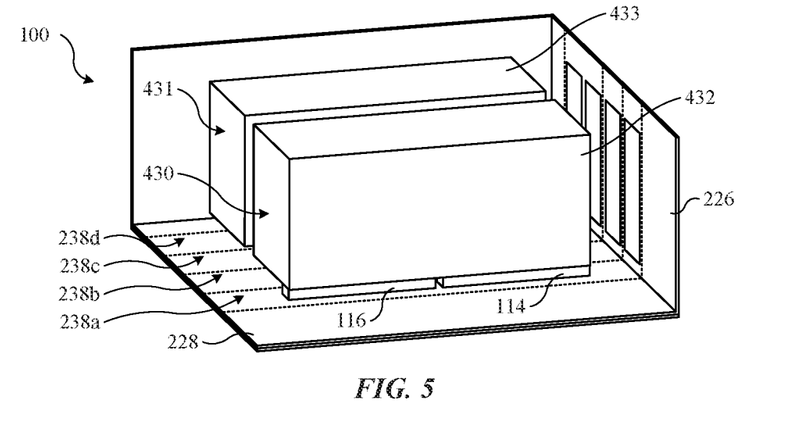
FIG. 5 is an illustration that shows the computer according to the second example with the first peripheral device and the second peripheral device in a connected position.

FIG. 4 is an illustration that shows the computer 100 with a first peripheral device 430 and a second peripheral device 431 in a disconnected position according to a second example, and FIG. 5 is an illustration that shows the computer 100 with the first peripheral device 430 and the second peripheral device 431 in a connected position. The computer 100 includes the chassis 226 and the system board 228, as previously described. The first interface slot 114, the extended interface slot 116 and the second interface slot 118 are arranged relative to the first slot width 238a, the second slot width 238b, the third slot width 238c, and the fourth slot width 238d as previously described.

The first peripheral device 430 includes a body portion 432. A connector portion, such as a first card edge connector 434, is connected to the body portion 432. The first peripheral device 430 differs from the peripheral device 230 in that the first peripheral device 430 excludes a second card edge connector and is not able to be connected to the extended interface slot 116. The length of the first peripheral device 430 may be sufficient, as in the illustrated example, to obstruct access to the extended interface slot 116. Thus, the extended interface slot 116 may be obstructed, as in the illustrated example.

The first peripheral device 430 further differs from the peripheral device 230 in that a width of the first peripheral device 430 is equivalent to two times the standard slot width. Thus, in the illustrated example, the first peripheral device 430 is located in the first slot width 238a and the second slot width 238b.

The second peripheral device 431 includes a body portion 433. A connector portion, such as a first card edge connector 435, is connected to the body portion 433. The second peripheral device 431 is similar to the first peripheral device 430. The second peripheral device 431 is connected to the computer 100 by connection of the first card edge connector 435 to the second interface slot 118, has a width that is equivalent to two times the standard slot width, and is located in the third slot width 238c and the fourth slot width 238d.

In the example shown in FIGS. 4-5, the interface bus 106 controls operation of the first interface slot 114, the extended interface slot 116, and the second interface slot 118. In the illustrated example, the interface bus 106 determines that the first peripheral device 430 does not require use of the extended interface slot 116, may deactivate the extended interface slot 116, and may make the resources that were otherwise available to the extended interface slot 116 available to other components, such as the second interface slot 118. Similarly, the interface bus 106 may determine that specific resources, such as power resources, are not needed by the extended interface slot 116, and those resources can be made available to other components, such as the second interface slot 118.

Figure 6:
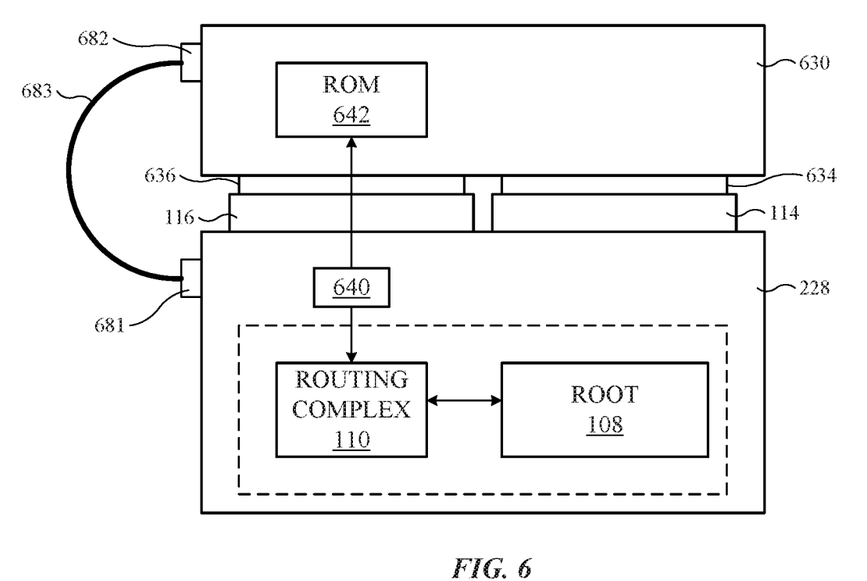
FIG. 6 is an illustration that shows a peripheral device that is connected to the first interface slot by a first card edge connector and is connected to the extended interface slot by a second card edge connector.

FIG. 6 is an illustration that shows a peripheral device 630 that is connected to the first interface slot 114 by a first card edge connector 634 and is connected to the extended interface slot 116 by a second card edge connector 636. In the illustrated example, an input/output (IO) channel 640 is defined across the second interface slot 118 and the second card edge connector 636 to allow communication between a read-only-memory (ROM) 642 of the peripheral device 630 and the root 108 of the interface bus 106. The root 108 is able to read information, such as configuration instructions, from the ROM 642 of the peripheral device 630. The configurations instructions (or other information) may describe any or all of data communication requirements, power requirements, and physical shape and size information that can be used by the root 108 as a basis for allocating resources to the peripheral device 630 and/or to other components that are connected to the interface bus 106. Use of the configuration instructions from the ROM 642 allows the CPU 102 to instruct the root 108 to allocate appropriate power and data resources to the peripheral device 630.

In one implementation, the peripheral device 630 may include the ROM 642. In such an implementation, the interface bus 106 may access configuration instructions that are stored on the peripheral device 630 in the ROM 642 and allocate interface resources to the first interface slot 114, the extended interface slot 116, and the second interface slot 118 based on the configuration instructions that are stored in the ROM 642.

In the implementation described with respect to FIG. 6, configuration instructions are accessed from the ROM 642 of the peripheral device 630. It should be understood that configuration instructions are not needed in all implementations. In some implementations, a peripheral device is configured without use of configuration instructions. In some implementations, configuration instructions are accessed from a storage location other than the ROM 642 of the peripheral device 630.

In addition to or as an alternative to supply of electrical power to the peripheral device 630, electrical power may be supplied from the system board 228 to the peripheral device 630 using a system-side power connector 681, a device-side power connector 682, and a power cable 683. The system-side power connector 681 and the device-side power connector 682 may be conventional power connectors, such as a six pin power connector or an eight pin power connector. Thus, in one implementation, a computer includes a power connector that is operable to supply additional electrical power to the first peripheral device using a power cable.

Figure 7:
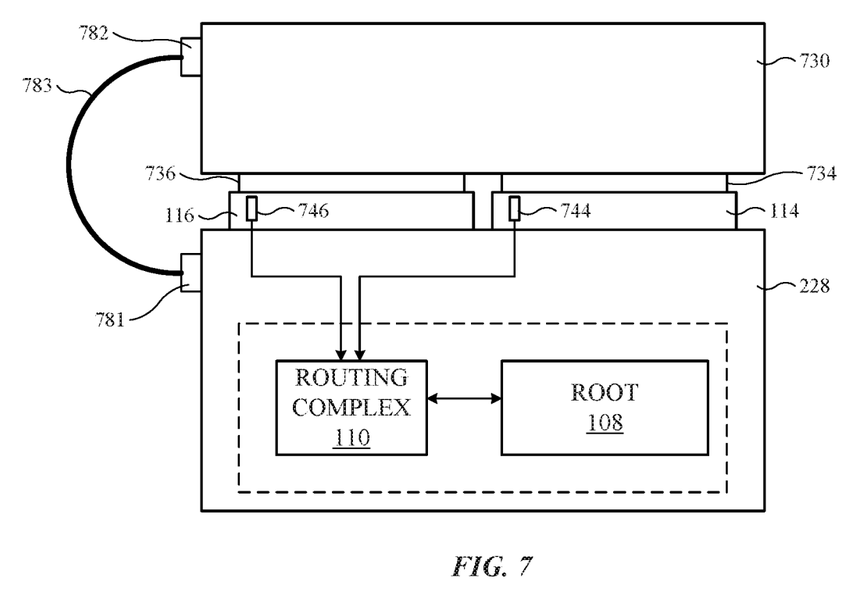
FIG. 7 is an illustration that shows a peripheral device that is connected to the first interface slot by a first card edge connector and is connected to the extended interface slot by a second card edge connector.

FIG. 7 is an illustration that shows a peripheral device 730 that is connected to the first interface slot 114 by a first card edge connector 734 and is connected to the extended interface slot 116 by a second card edge connector 736. In the illustrated example, a first sensing pin 744 is included in the first interface slot 114 and a second sensing pin 746 is included in the extended interface slot 116. The first sensing pin 744 and the second sensing pin 746 are utilized by the root 108 of the interface bus 106 to detect presence or absence of the first card edge connector 734 and the second card edge connector 736. Although the first sensing pin 744 and the second sensing pin 746 are described as single pins, it should be understood that groups of sensing pins could be used in place of the first sensing pin 744 and the second sensing pin 746.

As one example, the first sensing pin 744 and the second sensing pin 746 may be used to determine presence or absence of the first card edge connector 734 and the second card edge connector 736 by an electrical continuity check, such as by determining whether a circuit including one of the sensing pins is closed or determining whether a predetermined voltage is supplied across the sensing pins. The root 108 may assess signals received from the first sensing pin 744 and the second sensing pin 746 to determine how the peripheral device 730 is connected to the computer 100, including whether the peripheral device 730 is connected using both of the first interface slot 114 and the extended interface slot 116, or using only the first interface slot 114 without a connection to the extended interface slot 116.

In one implementation, the first interface slot 114 may include the first sensing pin 744, the extended interface slot 116 may include the includes a second sensing pin 746. In such an implementation, the interface bus 106 is configured to detect connection of the peripheral device 730 to the first interface slot 114 using the first sensing pin 744, and the interface bus 106 is configured to detect connection of the peripheral device 730 to the extended interface slot 116 using the second sensing pin 746.

In addition to or as an alternative to supply of electrical power to the peripheral device 730, electrical power may be supplied from the system board 228 to the peripheral device 730 using a system-side power connector 781, a device-side power connector 782, and a power cable 783. The system-side power connector 781 and the device-side power connector 782 may be conventional power connectors, such as a six pin power connector or an eight pin power connector. Thus, in one implementation, a computer includes a power connector that is operable to supply additional electrical power to the first peripheral device using a power cable.

Figure 8:
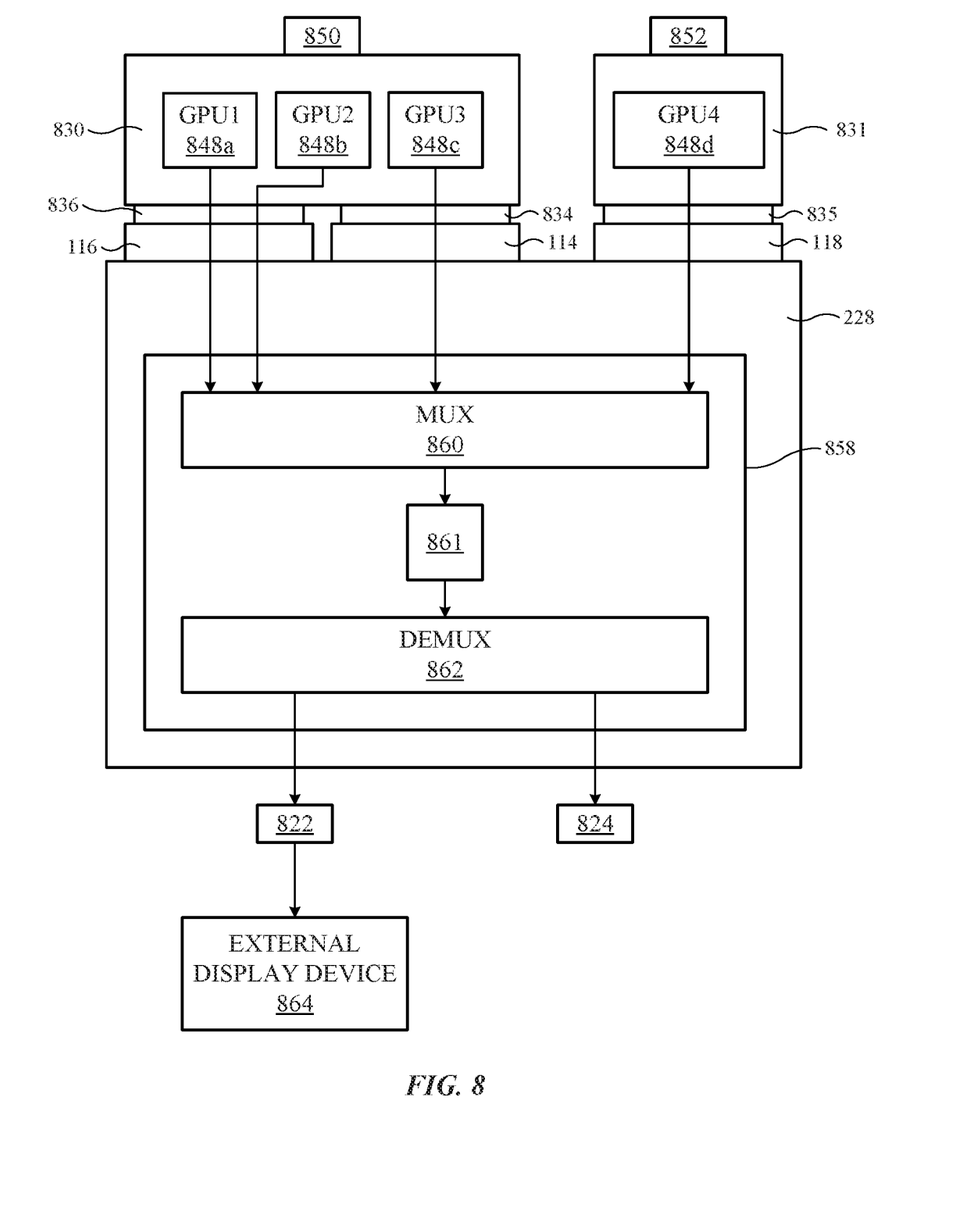
FIG. 8 is an illustration that shows a peripheral device that is connected to the system board of the computer.

FIG. 8 is an illustration that shows a first peripheral device 830 and a second peripheral device 831 that are connected to the system board 228 of the computer 100. In the illustrated example, the first peripheral device 830 is a graphics processing card that includes multiple graphics processing units (GPUs) such as a first GPU 848a, a second GPU 848b, and a third GPU 848c. The second peripheral device 831 is a graphics processing card that includes a fourth GPU 848d. The first GPU 848a, the second GPU 848b, the third GPU 848c, and the fourth GPU 848d are referred to herein collectively as GPUs 848a-848d. The first peripheral device 830 is connected to the system board 228 of the computer 100 by connection of a card edge connector 834 to the first interface slot 114 and by connection of a second card edge connector 836 to the extended interface slot 116. The second peripheral device 831 is connected to the system board 228 of the computer 100 by connection of a card edge connector 835 to the second interface slot 118.

The first peripheral device 830 and the second peripheral device 831 are each operable to output one or more video signals that can be displayed using display devices such as computer monitors. The first peripheral device 830 and the second peripheral device 831 can provide video signals to display devices that are connected to a display connector. Display connectors can be located on the first peripheral device 830 and the second peripheral device 831, such as a first peripheral device-mounted display connector 850 on the first peripheral device 830, and a second peripheral device-mounted display connector 852 on the second peripheral device 831. Display connectors can also be located on or connected to the system board 228 of the computer 100, such as a first system-mounted display connector 822 and a second system-mounted display connector 824.

When video signals are output by the first peripheral device 830 to a display device that is connected using the first peripheral device-mounted display connector 850 or video signals are output by the second peripheral device to a display device that is connected using the second peripheral device-mounted display connector 852, the video signals are not transferred to any component on the system board 228. Instead, the video signals are transferred from one of the GPUs 848a-d to the display connectors on the first peripheral device 830 or the second peripheral device 831, such as the first peripheral device-mounted display connector 850 on the first peripheral device (i.e., for the first through third GPUs 848a-c) and the second peripheral device-mounted display connector 852 (i.e., for the fourth GPU 848d).

When video signals are output by the first peripheral device 830 or the second peripheral device 831 to a display device that is connected using the first system-mounted display connector 822 or the second system-mounted display connector 824, the video signals are transferred from the first peripheral device 830 to the system board 228 using the card edge connector 834 and the first interface slot 114 or using the second card edge connector 836 and the extended interface slot 116 or from the second peripheral device 831 to the system board 228 using the card edge connector 835 and the second interface slot 118.

Because multiple peripheral devices that include GPUs 848a-d may be connected to the system board 228 and because there may be multiple display connectors mounted to the system board 228, the interface bus 106 of the computer 100 includes a routing component 858 that can be configured as desired to transmit a video signal from a specific one of the GPUs 848a-d to a specific display connector, such as the first system-mounted display connector 822 or the second system-mounted display connector 824.

The routing component 858 includes a multiplexer 860 and a demultiplexer 862. The multiplexer 860 is a device that is able receive and combine (as necessary) one or more input signals from the GPUs 848. The multiplexer 860 outputs a multiplexed signal 861 that includes information from the one or more input signals from the GPUs 848a-d. Signal portions that are included in the multiplexed signal 861 each correspond to one of the input signals, and the signal portions can include information that identifies a source or a destination of the signal portion. The demultiplexer 862 is connected to the multiplexer 860 and is able to receive the multiplexed signal 861 from the multiplexer as an input. The outputs of the demultiplexer 862 are connected to system-mounted display connectors, such as the first system-mounted display connector 822 and the second system-mounted display connector 824. The demultiplexer 862 forwards signal portions to desired destinations. Determining where signal portions are forwarded to can be performed based on information included in the signal portions or based on external information.

Controlling operation of the multiplexer 860 and the demultiplexer 862 can be performed, as examples, by the CPU 102 or by the root 108. In the illustrated example, an external display device 864 is connected to the first system-mounted display connector 822. The first GPU 848a is identified as being available for use. For example, identification of the first GPU 848a as being available for use can occur in response to connection of the external display device 864 to the first system-mounted display connector. The first peripheral device 830 causes transmission of the output signal from the first GPU 848a to the interface bus 106 (e.g., by redirecting the output signal from the first peripheral device-mounted display connector 850), for example, across the connection defined between the second card edge connector 836 and the extended interface slot 116. The output signal from the first GPU 848a is directed to the multiplexer 860 and is added to the multiplexed signal 861. The multiplexed signal 861 is directed to the demultiplexer 862 and the signal portion that corresponds to output from the first GPU 848a is directed to the first system-mounted display connector 822.

Upon connection of the external display device 864, an initial configuration (e.g., selection of which of the GPUs 848a-848d to use for a particular output) can be selected automatically by the interface bus 106 or another system of the computer 100. Subsequently, the initial configuration can be changed, such as by a user selecting a different one of the GPUs to utilize with a particular display connector using a graphical user interface associated with an operating system of the computer 100, or by any other suitable means.

Figure 9:
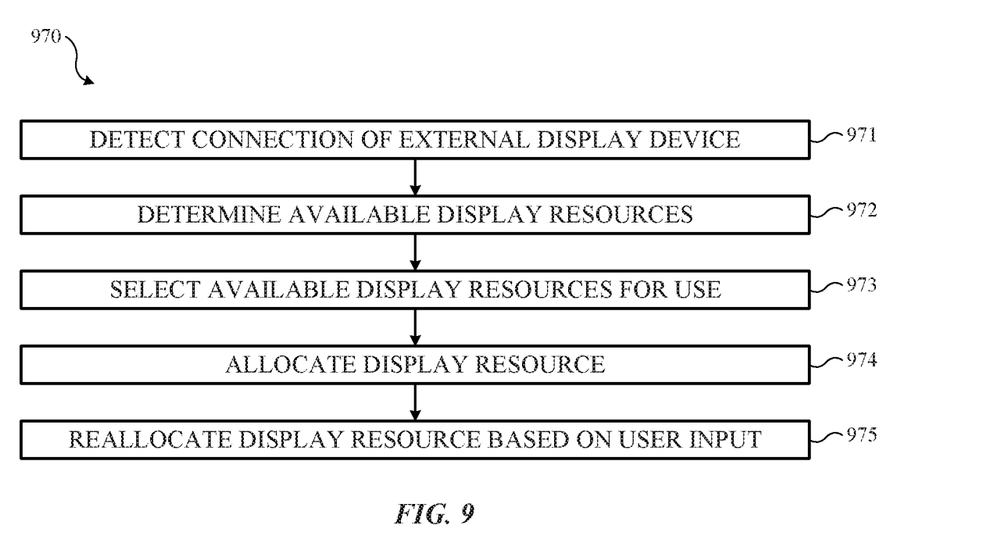
FIG. 9 is a flowchart that shows an example of a process for providing display resources to an external display.

FIG. 9 is a flowchart that shows an example of a process 970 for providing display resources to an external display. The process 970 may be implemented, for example, using the routing component 858, as described with respect to FIG. 8.

In operation 971, connection of the external display device 864 to a system-mounted display connector, such as the first system-mounted display connector 822, is detected. As an example, the display connector may be the first system-mounted display connector 822 or the second system-mounted display connector 824. Connection of the external display device 864 may be detected based on a signal that is output by the external display device 864 (e.g., a hot-swap signal). The signal may identify the external display device 864 and/or describe requirements for the external display device 864.

In operation 972, in response to detecting connection of the external display device 864 in operation 971, a determination is made as to what display resources are available. Operation 972 may be performed, for example, by identifying connected graphic processing units that are not currently being used. Operation 972 may be performed, as examples, by the CPU 102 or the routing component 858. The available display resources may correspond, for example, to two or more GPUs, such as the GPUs 848a-848d. For example, the routing component 858 may determine that the first GPU 848a and the second GPU 848b are available for use.

In operation 973, one of the available display resources, such as one of the GPUs 848a-848d, is selected for use. The selection made in operation 973 can be made by determining the requirements of the external display device 864 and matching those requirements to one of the GPUs 848a-848d by determining that the matching resource has capabilities that meet or exceed the requirements of the external display device. The available display resource that is selected in operation 973 may be referred to as a matching available display resource or a matching display resource. In operation 974, the matching available display resource is then allocated to the external display device 864. Allocation of display resources in operation 974 is performed in the manner described with respect to the routing component 858. For example, the routing component 858 may be configured to route the available display resource to the external display device through the system-mounted display connector using a multiplexer that is connected to the available display resources and a demultiplexer that is connected to the system-mounted display connector.

In situations in which the available display resources do not meet the requirements of the external display device 864 that was connected in operation 971, display resources can be selected for use in operation 973 by prioritizing the requirements of all of the currently connected displays, and allocating resources based on this prioritization. For example, by determining that a previously-connected display device is currently assigned to a GPU that meets the requirements or the recently-connected display device and determining that the requirements of the previously-connected display device can be serviced by an available display resource, in operation 974, the resources allocated to the previously-connected display device can be deallocated and reallocated to the recently-connected display device. An appropriate available display resource is then allocated to the previously connected display device.

In optional operation 975, a graphical user interface can be used to receive a user inputs that manually reassign display resources. The commands received from the user are used to deallocate and reallocate display resources using the routing component 858 as previously described.

While the description above is made with respect to wired display connectors, it should be understood that the same techniques could be applied to wireless display connections.

What is claimed is:

1. A computer, comprising:
    a processor;
    a PCIe-compatible interface bus that includes a root that is connected to the processor, and a routing complex that is connected to the root and is controlled by the processor;
    a first interface slot that is connectable to the root by the routing complex, wherein the first interface slot extends in a longitudinal direction;
    a second interface slot that is connectable to the root by the routing complex, wherein the second interface slot extends in the longitudinal direction and is laterally offset from the first interface slot; and
    an extended interface slot that is connectable to the root by the routing complex, wherein the first interface slot and the extended interface slot are arranged in a linear alignment,
    wherein the routing complex is connectable to a first peripheral device that connects only to the first interface slot, the routing complex is connectable to a second peripheral device that connects to both of the first interface slot and the second interface slot, the routing complex is configured to define a first switching configuration when the first peripheral device is connected only to the first interface slot, and the routing complex is configured to define a second switching configuration when the second peripheral device is connected to both of the first interface slot and the extended interface slot,
    wherein the routing complex activates the second interface slot in the first switching configuration so that a first communication resource is provided to the second interface slot by the root of the PCIe-compatible interface bus in the first switching configuration in response to connection of the first peripheral device only to the first interface slot, and
    wherein the routing complex deactivates the second interface slot in the second switching configuration so that the first communication resource is not provided to the second interface slot by the root of the PCIe-compatible interface bus in the second switching configuration in response to connection of the second peripheral device to both of the first interface slot and the extended interface slot.

2. The computer of claim 1, wherein the second interface slot is laterally offset from the first interface slot by an empty slot width that is positioned between the first interface slot and the second interface slot, wherein the empty slot width is free from interface slots.

3. The computer of claim 1, wherein the first interface slot includes a first sensing pin, the extended interface slot includes a second sensing pin, the PCIe-compatible interface bus is configured to detect connection of one of the first peripheral device or the second peripheral device to the first interface slot using the first sensing pin, and the PCIe-compatible interface bus is configured to detect connection of the second peripheral device to the extended interface slot using the second sensing pin.

4. A computer, comprising:
    a first interface slot that extends in a longitudinal direction;
    a second interface slot that extends in the longitudinal direction and is laterally offset from the first interface slot;
    an extended interface slot that extends in the longitudinal direction and is arranged in a linear alignment with respect to the first interface slot; and
    an interface bus that is connected to the first interface slot and the extended interface slot, is operable to sense connection of a first peripheral device to the first interface slot, and to determine whether the first peripheral device is concurrently connected to the first interface slot and the extended interface slot, wherein the interface bus deallocates an interface resource from the second interface slot and reallocates the interface resource to the extended interface slot if the first peripheral device is concurrently connected to the first interface slot and the extended interface slot, and the interface bus does not reallocate the interface resource from the second interface slot to the extended interface slot if the first peripheral device is not concurrently connected to the first interface slot and the extended interface slot.

5. The computer of claim 4, wherein the second interface slot is laterally offset from the first interface slot by an empty slot width that is positioned between the first interface slot and the second interface slot, wherein the empty slot width is free from interface slots.

6. The computer of claim 4, wherein the first interface slot and the second interface slot are each compliant with the PCIe standard.

7. The computer of claim 4, wherein the interface bus accesses configuration instructions that are stored on the first peripheral device and allocates the interface resource based on the configuration instructions.

8. The computer of claim 4, wherein the first interface slot includes a first sensing pin, the extended interface slot includes a second sensing pin, the interface bus is configured to detect connection of the first peripheral device to the first interface slot using the first sensing pin, and the interface bus is configured to detect connection of the first peripheral device to the extended interface slot using the second sensing pin.

9. The computer of claim 4, wherein the interface resource includes communications channels.

10. The computer of claim 4, wherein the interface resource includes electrical power.

11. The computer of claim 10, further comprising:
    a power connector that is operable to supply additional electrical power to the first peripheral device using a power cable.

12. The computer of claim 11, wherein the power connector is at least one of a six pin power connector or an eight pin power connector.

13. The computer of claim 4, wherein the extended interface slot is operable to supply at least one-hundred and fifty watts of electrical power to the first peripheral device.

14. A computer, comprising:
a processor;
a PCIe-compatible interface bus that includes a root that is connected to the processor, and a routing complex that is connected to the root and is controlled by the processor;
a first interface slot that is connectable to the root by the routing complex;
an extended interface slot that is connectable to the root by the routing complex, wherein the first interface slot and the extended interface slot are aligned with one another within a single slot width;
one or more system-mounted display connectors; and
a peripheral device that includes at least a first graphics processing unit and a second graphics processing unit, wherein the routing complex is configurable based on properties of the peripheral device to connect the first graphics processing unit to the one or more system-mounted display connectors through the first interface slot to allow transmission of a first video signal from the first graphics processing unit to the one or more system mounted display connectors using the first interface slot and to connect the second graphics processing unit to the one or more system-mounted display connectors through the extended interface slot to allow transmission of a second video signal from the second graphics processing unit to the one or more system-mounted display connectors through the extended interface slot.

15. The computer of claim 1, wherein the second peripheral device obstructs access to the second interface slot by location of the second peripheral device directly above the second interface slot and within a slot width corresponding to the second interface slot when the second peripheral device is connected to both of the first interface slot and the extended interface slot.

16. The computer of claim 4, wherein the first peripheral device obstructs access to the second interface slot by location of the first peripheral device directly above the second interface slot and within a slot width corresponding to the second interface slot when the first peripheral device is connected to both of the first interface slot and the extended interface slot.

17. The computer of claim 1, wherein the extended interface slot is operable to supply at least one-hundred and fifty watts of electrical power to the second peripheral device.

18. The computer of claim 14, wherein the first interface slot is compliant with the PCIe standard.

19. The computer of claim 14, wherein the interface bus accesses configuration instructions that are stored on the first peripheral device and configures the routing complex based on the configuration instructions.

20. The computer of claim 14, wherein the extended interface slot is operable to supply at least one-hundred and fifty watts of electrical power to the second peripheral device.

* * * * *